US012047727B2

(12) United States Patent
Zeltzer et al.

(10) Patent No.: US 12,047,727 B2
(45) Date of Patent: Jul. 23, 2024

(54) ELECTROSTATIC EARPHONE WITH ADJUSTABLE ACOUSTIC TRANSPARENCY

(71) Applicant: Waves Audio Ltd., Tel Aviv (IL)

(72) Inventors: Gabriel Zeltzer, Lapid (IL); Meir Shaashua, Tel Aviv (IL)

(73) Assignee: Waves Audio Ltd., Tel Aviv (IL)

( * ) Notice: Subject to any disclaimer, the term of this patent is extended or adjusted under 35 U.S.C. 154(b) by 124 days.

(21) Appl. No.: 17/838,220

(22) Filed: Jun. 12, 2022

(65) Prior Publication Data

US 2022/0312105 A1 Sep. 29, 2022

Related U.S. Application Data

(63) Continuation-in-part of application No. PCT/IL2021/050536, filed on May 11, 2021.

(30) Foreign Application Priority Data

May 18, 2020 (GB) ..................................... 2007324

(51) Int. Cl.
*H04R 1/10* (2006.01)
*G10K 11/178* (2006.01)
(Continued)

(52) U.S. Cl.
CPC ..... *H04R 1/1041* (2013.01); *G10K 11/17825* (2018.01); *G10K 11/17827* (2018.01);
(Continued)

(58) Field of Classification Search
CPC .. H04R 1/1041; H04R 1/1016; H04R 1/1025; H04R 1/1075; H04R 3/06;
(Continued)

(56) References Cited

U.S. PATENT DOCUMENTS 2,968,695 A 1/1961 Corliss et al.
3,668,335 A 6/1972 Beveridge
(Continued)

FOREIGN PATENT DOCUMENTS

JP 6274497 B2 2/2018

OTHER PUBLICATIONS

Declaration under 1.131 U.S. Appl. No. 13/605,656 now U.S. Pat. No. 9,210,497 by Roger Stephen Grinnip III Section 0.1 General Safety Considerations p. 4.

*Primary Examiner* — Disler Paul
(74) *Attorney, Agent, or Firm* — Dr. Hanan Farber Patent Agent Ltd.

(57) ABSTRACT

An electrostatic transducer including a membrane, a first electrode and a second electrode. The first electrode is disposed parallel to the membrane. The membrane is configured to respond mechanically to a varying first electric field in accordance with respective electric potentials applied between the first electrode and the membrane. The second electrode is disposed parallel to the membrane opposite from the first electrode. The membrane is configured to respond mechanically to a varying second electric field in accordance with respective electric potentials between the second electrode and the membrane. The first and second electrodes have through holes configured for acoustic transmission to and from the membrane. The housing includes: (i) a nozzle configured for acoustic transmission from the membrane through the holes of the first electrode to an ear canal and (ii) an aperture configured to provide acoustic transmission through the holes of the second electrode between the membrane and air external to the housing.

17 Claims, 6 Drawing Sheets

(51) Int. Cl.

| | |
|---|---|
| ***H04R 3/06*** | (2006.01) |
| ***H04R 7/04*** | (2006.01) |
| ***H04R 7/18*** | (2006.01) |
| ***H04R 19/00*** | (2006.01) |
| ***H04R 19/02*** | (2006.01) |
| ***H04R 29/00*** | (2006.01) |
| *H04R 3/00* | (2006.01) |

(52) U.S. Cl.
CPC ......... *H04R 1/1016* (2013.01); *H04R 1/1025* (2013.01); *H04R 1/1075* (2013.01); *H04R 3/06* (2013.01); *H04R 7/04* (2013.01); *H04R 7/18* (2013.01); *H04R 19/00* (2013.01); *H04R 19/02* (2013.01); *H04R 29/001* (2013.01); *G10K 2210/3026* (2013.01); *H04R 3/007* (2013.01); *H04R 2430/01* (2013.01)

(58) Field of Classification Search
CPC ....... G10K 11/17825; G10K 11/17827; G10K 2210/3026
USPC ........................................................... 381/74
See application file for complete search history.

(56) References Cited

U.S. PATENT DOCUMENTS

| | | | | |
|---|---|---|---|---|
| 3,773,976 | A | 11/1973 | Beveridge | |
| 9,210,497 | B2 | 12/2015 | Grinnip, III | |
| 9,924,261 | B2 * | 3/2018 | Parkins | H04R 1/08 |
| 10,017,379 | B2 * | 7/2018 | Rajaraman | H04R 31/003 |
| 10,165,348 | B2 * | 12/2018 | Kirsch | H04R 3/04 |
| 10,165,352 | B2 * | 12/2018 | Cartwright | H04R 1/1075 |
| 10,178,459 | B2 * | 1/2019 | Clark | H04R 31/00 |
| 10,206,051 | B2 * | 2/2019 | Boley | H04R 25/652 |
| 10,448,147 | B2 * | 10/2019 | Seo | H04R 1/1016 |
| 10,771,903 | B2 * | 9/2020 | Zhou | H04R 19/005 |
| 11,218,793 | B2 * | 1/2022 | Ko | H04R 1/1075 |
| 11,493,381 | B2 * | 11/2022 | Zhou | G01S 15/104 |
| 2005/0281419 | A1 | 12/2005 | Miyazaki | |
| 2006/0072770 | A1 | 4/2006 | Miyazaki | |
| 2007/0124620 | A1 | 5/2007 | Miyazaki | |
| 2014/0241536 | A1 | 8/2014 | Adams | |
| 2020/0105243 | A1 | 4/2020 | Jorritsma | |

* cited by examiner

ELECTROSTATIC EARPHONE WITH ADJUSTABLE ACOUSTIC TRANSPARENCY

CROSS REFERENCE TO RELATED APPLICATIONS

This application is a continuation-in-part of International Application No. PCT/IL2021/050536, filed May 11, 2021 which claims benefit from GB2007324.3 filed in UKIPO on May 18, 2020.

BACKGROUND

1. Technical Field

The present invention relates to electrostatic audio devices, and particular an electrostatic acoustic device in earphones.

2. Description of Related Art

In the art of high fidelity sound reproduction, the electrostatic loudspeaker has received attention because of inherent excellent sound quality and smooth response over wide frequency ranges. In such devices, a flexible sound producing membrane is positioned near an electrode, or in the case of a push-pull arrangement, a pair of electrodes, one on either side of the membrane. A polarization potential is applied between the membrane and the electrodes, and an audio signal is superimposed on the electrodes, causing the membrane to move in response to the audio signal. Electrodes are acoustically transmissive so that sound produced by the moving membrane radiates outward through the electrode to the listening area.

Electrostatic devices are highly efficient both electrically and mechanically. Electrical impedance is high and decreases with increasing acoustic frequency. High electrical impedance results in very low operating currents and minimal electrical losses. Mechanically, there are no moving parts other than the moving membrane which is very light in weight. Electrostatic devices are therefore inherently more energy efficient than electrodynamic acoustic devices currently used in battery operated electronic devices.

Independent of the type of transducer, an earphone may have an open back housing or a closed-back housing. Open back earphones are open to the environment and may allow some ambient sound into the earphones and also sound from the earphones may be transmitted into the environment. The choice of whether to use open back earphones or closed-back earphones may depend on the specific application and preference of the user.

U.S. Pat. No. 9,210,497 discloses an electrostatic earphone with a closed-back. Shure KSE1200SYS Analog Electrostatic Earphone System user guide, version: 2020-A, cites U.S. Pat. No. 9,210,497 and describes a closed back design with <37 decibels of sound isolation. A separate high voltage power supply supplies bias voltages f 200 Volts DC to the KSE1200 earphones during operation.

BRIEF SUMMARY

Various earphone assemblies and methods as disclosed herein include: an electrostatic transducer including a membrane, a first electrode and a second electrode. The first electrode is disposed parallel to the membrane. The membrane is configured to respond mechanically to a varying first electric field in accordance with respective electric potentials applied between the first electrode and the membrane. The second electrode is disposed parallel to the membrane opposite from the first electrode. The membrane is configured to respond mechanically to a varying second electric field in accordance with respective electric potentials between the second electrode and the membrane. The first and second electrodes have through holes configured for acoustic transmission to and from the membrane. The housing includes: (i) a nozzle configured for acoustic transmission from the membrane through the holes of the first electrode to an ear canal and (ii) an aperture configured to provide acoustic transmission through the holes of the second electrode between the membrane and air external to the housing. A mechanism may attach to the aperture configured to adjust the acoustic transmission through the aperture by adjusting the aperture. First and second membrane supports may to an edge of the membrane. A central region of the membrane may be unsupported by the support. The first membrane support and the first electrode may be manufactured as a single element. The second membrane support and the second electrode may be manufactured as a single element.

The first electrode may include a first conductive layer deposited on an electrically insulated substrate. The first conductive layer may be assembled proximate to the membrane. The second electrode may include a second conductive layer deposited on an electrically insulated substrate. The second conductive layer may be assembled proximate to the membrane. The earphone assembly may include a control circuit including: an audio voltage input; a detector configured to detect a current or charge signal from the electrostatic transducer, the current or charge signal including an audio signal varying at audio frequencies. The detector may be configured to produce an audio output signal varying at audio frequency. A transform circuit may be configured to transform the audio output signal to produce a feedback signal. A comparator may be configured to compare a varying input audio voltage at the audio voltage input to the feedback signal to produce an error signal. A controller may be configured to input a control signal to the electrostatic transducer. The control signal may be responsive to the error signal. A probe signal varying at radio frequency may be injected into the electrostatic transducer. The current or charge signal may be detected by converting the current or charge signal to a modulated voltage signal. The current or charge signal may include the audio signal modulating the radio frequency of the probe signal. The control signal may be configured to control acoustic transparency of the earphone assembly, from the air external to the housing through the membrane to the nozzle. The control signal and a level of the varying input audio voltage may be configured to control acoustic transparency of the earphone assembly, from the air external to the housing through the membrane to the nozzle.

The control signal and a level of the varying input audio voltage may be configured to maintain a level of the audio output signal varying at audio frequency by controlling a level of the control signal in accordance with a level of a varying audio voltage at the audio voltage input. The control signal and a level of the varying input audio voltage may be configured to maintain a level of the audio output signal varying at audio frequency by controlling a level of the control signal inversely with a level of a varying audio voltage at the audio voltage input. The control signal may be configured to cancel at least in part a mechanical response of the membrane due to ambient sound. The control signal may be configured to cancel at least in part a mechanical response of the membrane due to air motion through or around the aperture. The control signal may be configured to limit mechanical displacement of the membrane. The earphone assembly may further include: a battery and a power circuit, connectable to the battery. The power circuit may be configured as: (i) a single ended power circuit in which DC bias voltages are applied on the electrodes, an audio signal is applied to the membrane and the detector is configured to detect the current or charge signal on the electrodes or (ii) a balanced power circuit, in which a non-inverted audio signal may be applied to one of the electrodes and an identical but inverted audio signal may be applied to the other electrode, the membrane is biased with a DC bias voltage, and the detector is configured to detect the current or charge signal on the membrane. The earphone assembly may further include a seal configured to removably attach to the nozzle and configured to seal acoustically an interior of the nozzle to the inside of an ear canal.

BRIEF DESCRIPTION OF THE DRAWINGS

The invention is herein described, by way of example only, with reference to the accompanying drawings, wherein.

Figure 1A:
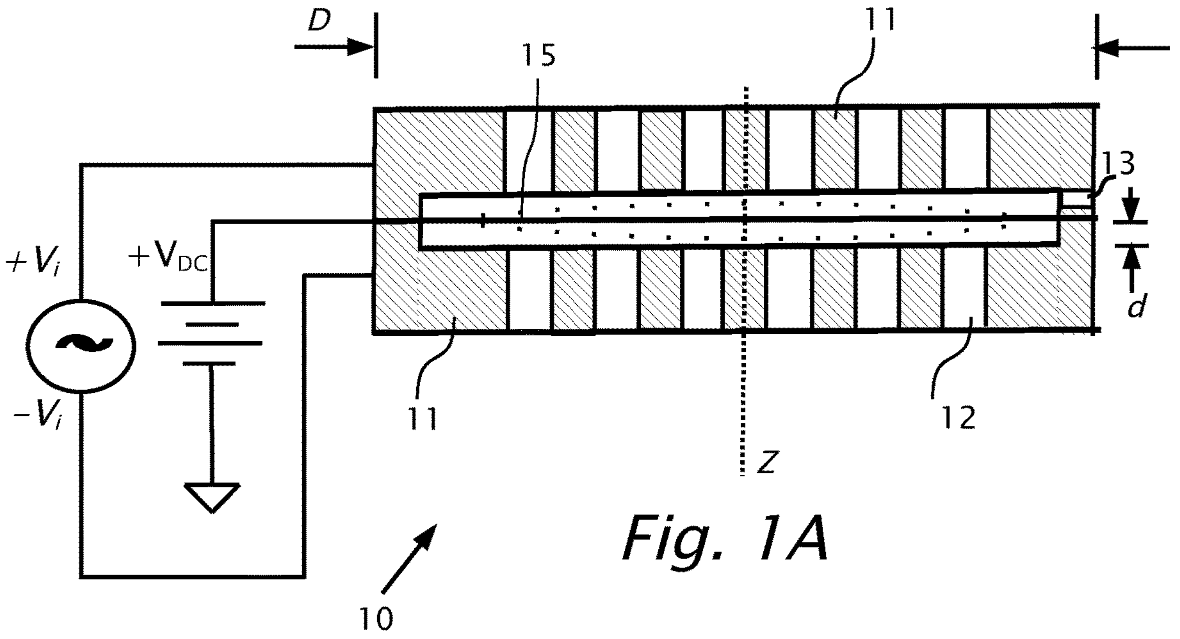
FIG. 1A illustrates schematically a cross-sectional view of an electrostatic device, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, different aspects of the present invention may be directed to a electrostatic design for an in-ear earphone, also known as an earbud. For an earbud application, an electrostatic speaker may have maximum dimension, e.g. diameter D of 5 millimeters or less. Thus, in embodiments of the present invention including an electrostatic acoustic device being used in an earphone and sealed into the ear canal, the mechanical displacement of the ear drum may become coupled with the mechanical displacement of the membrane. Features of the present invention include an earphone housing with one or more apertures to provide an acoustically transmissive back, an integrated power source, e.g. battery with power circuitry and audio circuitry integrated within the in-ear housing. Various modes of operation are available including 1) a noise cancellation mode in which feedback to the electro-acoustic device is configured to cancel ambient sound or noise; 2) a fully acoustic transparent mode in which there is no feedback to the electro-acoustic device 3) Acoustic transparency, that is the extent the user hears ambient sound may be adjusted by tuning feedback in a control circuit as disclosed herein. Tuning of feedback may be provided to provide adjustable acoustic transparency while maintaining a constant output audio level to the user. These modes of operation are available with different settings of adjustable physical aperture, the size and/or number of apertures in the back of the housing.

Referring now to the drawings, reference is now made to FIG. 1, which illustrates schematically an electrostatic acoustic device 10, according to features of the present invention. Vertical axis Z is shown through a center of acoustic device 10. A tensioned membrane 15 is supported, by edges of electrodes 11, essentially in a plane perpendicular to vertical axis Z. Membrane supports, i.e. edges of electrodes 11 are shown as manufactured with electrodes 11 as single elements. Alternatively, separate support rings may be used to support tensioned membrane 15 in place. Membrane 15 may be impregnated with a conductive, resistive and/or electrostatic material so that membrane 15 responds mechanically to a changing electric field. The central regions of electrodes 11 are mounted proximate to, e.g. in parallel to, membrane 15, nominally equidistant, at a distance d, e.g. 20-500 micrometers from membrane 15. Electrodes 11 as illustrated may be perforated with apertures 12 transmissive to sound waves emanating from membrane 15 when electrostatic acoustic device 10 is operating. Alternatively or in addition one or more side ports 13 may pass sound waves from air surrounding membrane 15 to outside device 10.

Electrodes 11 may include an electrically insulating substrate, e.g. ceramic, coated with a conductive layer. The conductive layer may be essentially metallic including: titanium, palladium, platinum, gold, silver, aluminum, copper, iron, tin, bronze, brass and steel, by way of example. The conductive layers are assembled facing and proximate to membrane 15 and the insulating substrates are facing outward.

During operation of electrostatic acoustic device 10, in a balanced power configuration, audio voltage signals$\pm V_i$ may be applied to electrodes 11. A non-inverted voltage signals$\pm V_i$ may be applied to one of electrodes 11 and an identical but inverted (or 180 degrees out of phase) voltage signal $-V_i$ may be applied to the other electrode 11. Membrane 15 may be biased with a direct current (DC) bias voltage, e.g. $+V_{DC}=+50$ to $+500$ volts. Alternatively in a single-ended configuration, voltage signal $V_i$ may be applied to membrane 15 and electrodes 11 may be biased at $+V_{DC}/2$. Voltage signals$\pm V_i$ may vary at audio frequencies, nominally between 20-20,000 Hertz. Dotted lines illustrate schematically membrane 15 moving in response to a changing electric voltage due to voltage signals$\pm V_i$.

Figure 1B:
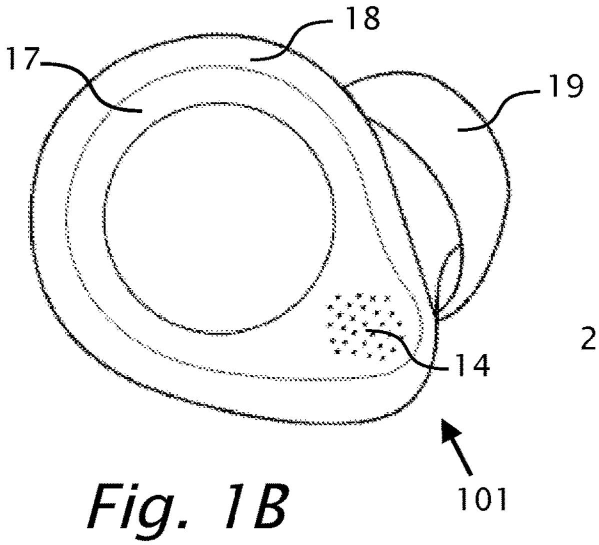
FIG. 1B is an isometric view, as viewed from the back, of an earphone according to features of the present invention.

Reference is now also made to FIG. 1B, an isometric view, as viewed from the back, of an earphone 101 according to features of the present invention. A housing of earphone 101 includes one or more assembled parts, back-housing 17 and front-housing 18. Back-housing 17 includes one or more apertures 14 or through-holes which provide acoustic transparency from the ambient through apertures 14, through apertures 12 of electrode 11 to membrane 15.

Figure 1C:
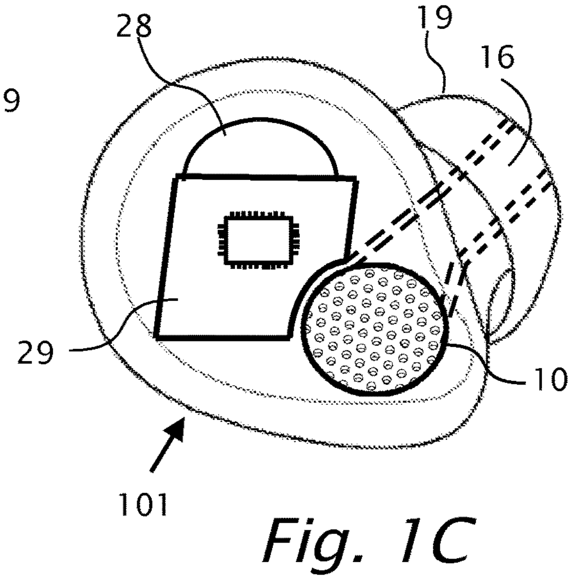
FIG. 1C illustrates the earphone as viewed from the back as in FIG. 1B with a back cover removed, according to further features of the present invention.

Reference is now also made to FIG. 1C, which illustrates earphone 101 with back-housing 17 removed, according to features of the present invention. An acoustic seal 19 may be removably fitted over a nozzle 16. Acoustic seal 19 is intended to fit and acoustically seal inside an ear canal of a user. Interior of nozzle 16 is a channel which leads to electrostatic acoustic device 10 which includes membrane 15 sealed therein (not shown). Circuit board 29 may include a DC-DC converter which provides direct current (DC) bias voltage(s) $V_{DC}$ from a voltage input from a battery 28 Circuit board 29 may include circuits for providing audio voltage signals$\pm V_i$ and other circuitry as disclosed herein or otherwise desired.

Figure 1D:
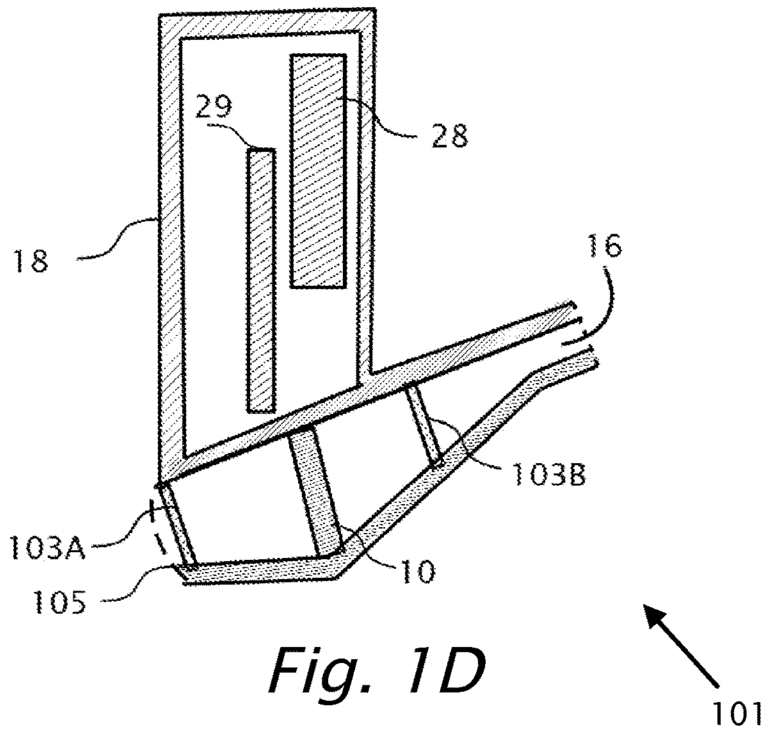
FIG. 1D illustrates a side cross-sectional schematic view of an earphone, according to further features of the present invention.

Reference is now also made to FIG. 1D which illustrates schematically a side cross-sectional view of an earphone 101, according to further features of the present invention. As in FIG. 1C, interior of nozzle 16 is a channel leading to electrostatic acoustic device 10 which includes membrane 15 sealed therein (not shown) and open to the ambient at back end 105. Environmental protection elements 103A and 103B are intended to protect from dust, earwax and/or water spray from entering electro-acoustic device 10. Environmental protection elements 103A and 103B may be an acoustically transparent steel mesh or fabric such as silk or combination thereof. Notably, during use of earphone 101, channel 16 is preferably sealed at one end by the ear canal of a user and at the other end by membrane 15 internal to electro-acoustic device 10. At the other side of electro-acoustic device 10, the channel is physically open and acoustically transparent at back end 105.

Figure 2:
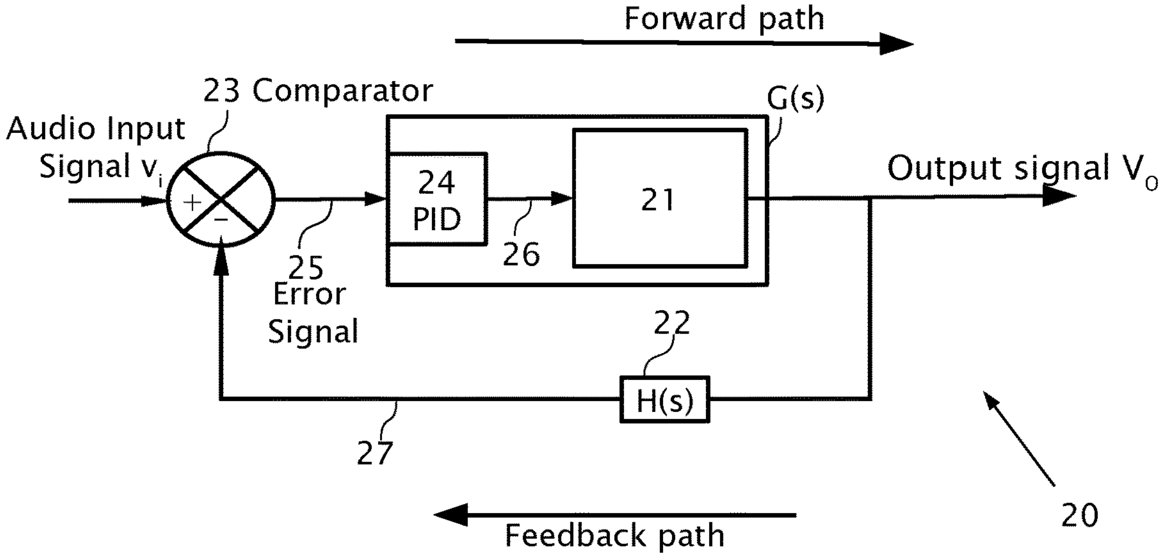
FIG. 2 is an electronic block diagram of a feedback control system, according to features of the present invention.

Reference is now made to FIG. 2, which illustrates a control circuit 20, according to features of the present invention. In the forward path, G(s) represents open loop gain of the control circuit including system 21, where s may be a complex variable representing an alternating voltage signal in the form $A(e^{i\omega t}+\varphi)$ where A represents an amplitude, $\omega=2\pi f$ represents an angular frequency, where f represents a frequency in Hertz and $\varphi$ represents a phase shift in radians.

Figure 2A:
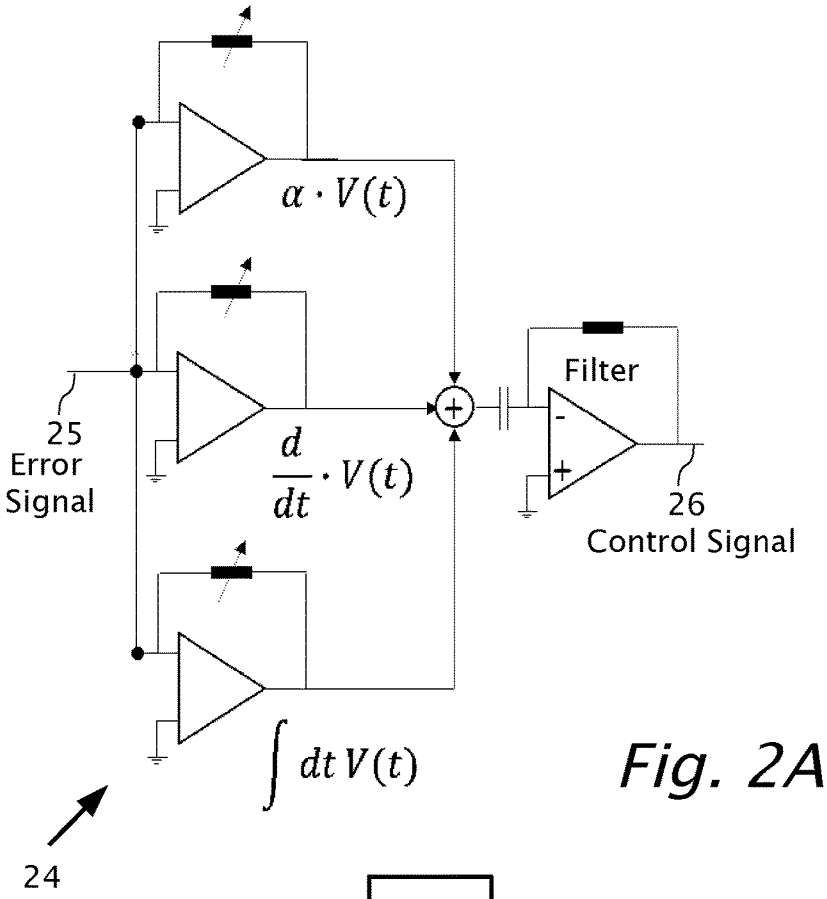
FIG. 2A illustrates an electronic block diagram of a proportional-integral-derivative controller (PID) controller, according to conventional art.

Reference is now also made to FIG. 2A, which illustrates a Proportional, Integral and Derivative (PID) block 24, according to conventional art. The feedback loop may include in the forward path G(s) Proportional, Integral and Derivative (PID) block 24. Block 24 may include relative to error signal 25, a proportional gain, a differential and/or integration in linear combination as well as frequency filtering to output a control signal 26.

Referring back to FIG. 2, in the feedback path, block 22 represents transform function H(s) of an output voltage signal $V_o$. The feedback path output from feedback block 22 may output a feedback signal 27, which may be subtracted by comparator 23 from the input signal $V_i$ to produce an error signal 25. Responsive to error signal 25, PID controller 24 outputs control signal 26 to controller block 21 so that the output signal $V_o$ approaches a set point. Overall transfer function of system 20, voltage output $V_o$ divided by voltage input $V_i$ of controller 21 may be modeled by equation 1:

$$\frac{V_o}{v_i} = \frac{G(s)}{1 + G(s) \cdot H(s)} \tag{1}$$

When input signal $V_i$ is nominally zero, feedback signal 27 becomes error signal 25. Alternatively, instead of comparator 23, a signal combiner 23 may be equivalently used and feedback block 22 appropriately transforms, e.g. inverts, voltage output signal $V_i$ to feedback signal 27 which is combined into error signal 25.

Stability of control system 20 is contingent upon the denominator 1+G (s)·H (s) having sufficiently large absolute value and/or being non-zero. It is well known that in a resonant system 21, including a damped harmonic oscillator with an external drive that the response of an oscillator is in phase (i.e. $\varphi\approx0$) with the external drive for driving frequencies well below the resonant frequency, is in phase quadrature (i.e. $\varphi\approx\pi/2$) at the resonant frequency, and is anti-phase (i.e. $\varphi\approx\pi$) for frequencies well above the resonant frequency. If control system 21 includes a resonance and an oscillating energy source, then in order to maintain stability, the oscillating energy source operates either below or above the resonant frequency without ever crossing the resonant frequency. In case of resonance frequency cross-over, a phase shift filter may be added to mitigate the phase response discontinuity.

Figure 3:
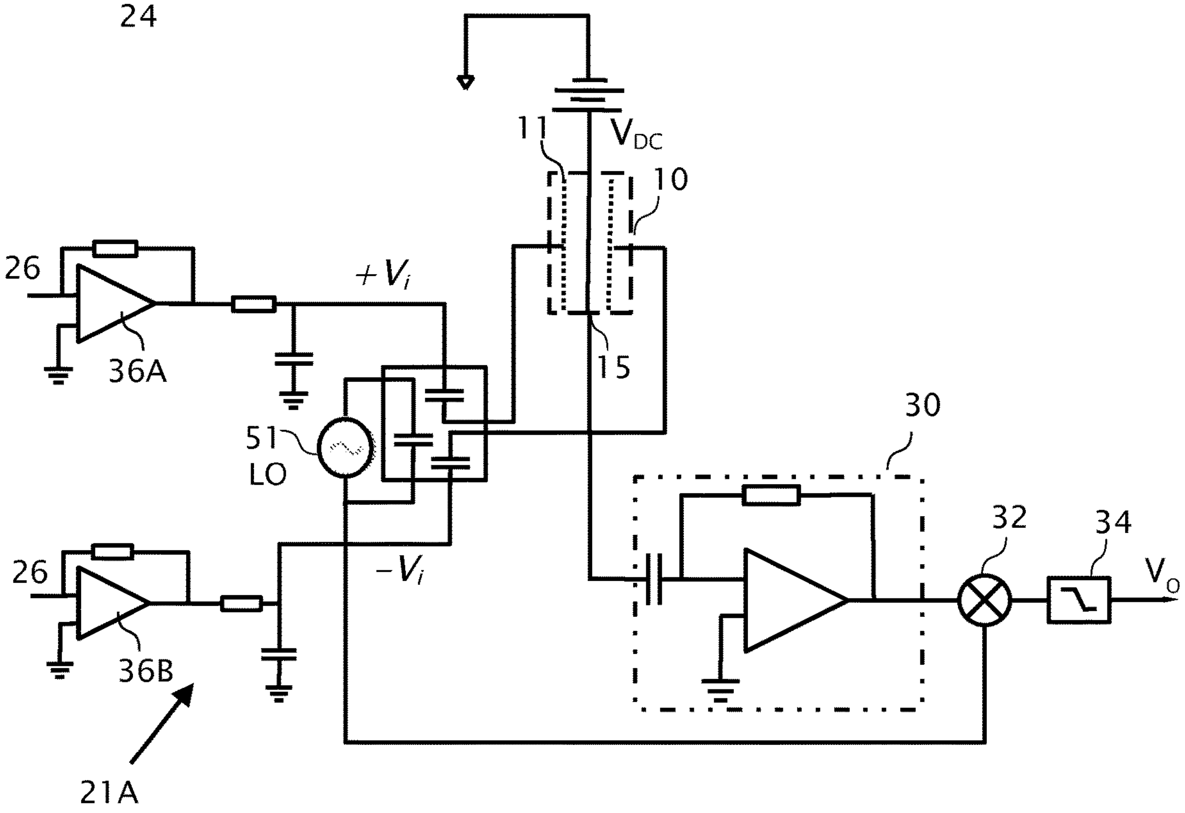
FIG. 3 is an electronic block diagram of a control circuit including an electrostatic acoustic device, in the forward path of the feedback control system of FIG. 2.

Reference is now also made to FIG. 3, which illustrates schematically a controller 21A, an alternative for system 21 in FIG. 2, according to features of the present invention. Controller 21A includes electrostatic acoustic device 10 which may be configured in a balanced power configuration to receive a high voltage audio input $+V_i$ at first electrode 11 and an inverted high voltage audio input $-V_i$ at second electrode 11 varying at audio frequencies intended for transduction into sound by electrostatic acoustic device 10. In addition, membrane 15 may respond mechanically as device 10 may behave as a capacitive microphone to ambient sound waves or noise caused by wind or ambient air motion, by way of example.

A probe signal from a local oscillator (LO) 51 at radio frequency, e.g. 0.1-10 megahertz and audio signal $+V_i$ and inverted audio signal $-V_i$ may be capacitively coupled to electrodes 11. Alternatively, a galvanic transformer may be used instead of capacitive coupling as shown. Audio signals$\pm V_i$ may be high voltage signals. Alternatively, audio signals$\pm V_i$ may be voltage signals up to ~±200V with direct current high voltage bias $V_{DC}$ applied to membrane 15. The probe signal produces a current which has a magnitude determined by the characteristic reactance of the electric circuit formed by the membrane 15 and electrodes 11, essentially a variable capacitor. An advantage of using local oscillator (LO) 51 at radio frequency is in the fact that radio frequency doesn't produce a perceptible mechanical motion of membrane 15 but is modulated by the electrical change in capacitance which is related to the mechanical motion produced when an audio signal is present. Probe signal from local oscillator (LO) 51 may also be combined with the voltage output of amplifier 30 at signal combiner/multiplier 32. Signal combiner/multiplier 32 outputs to a low pass filter 34 which demodulates and transmits voltage output signal $V_o$, varying at audio frequencies.

Circuit 21A is a homodyne detection circuit which uses local oscillator 51 as a reference which is multiplied with the measured signal output of amplifier 30 at the same frequency. The base band or DC component of this multiplication includes the signal which is frequency converted from a narrow band around LO 51 frequency detected with a very high signal to noise ratio. Multiplier 32 may be implemented with analog circuit AD835 from Analog Devices Inc (Norwood, MA, USA), by way of example.

Figure 5:
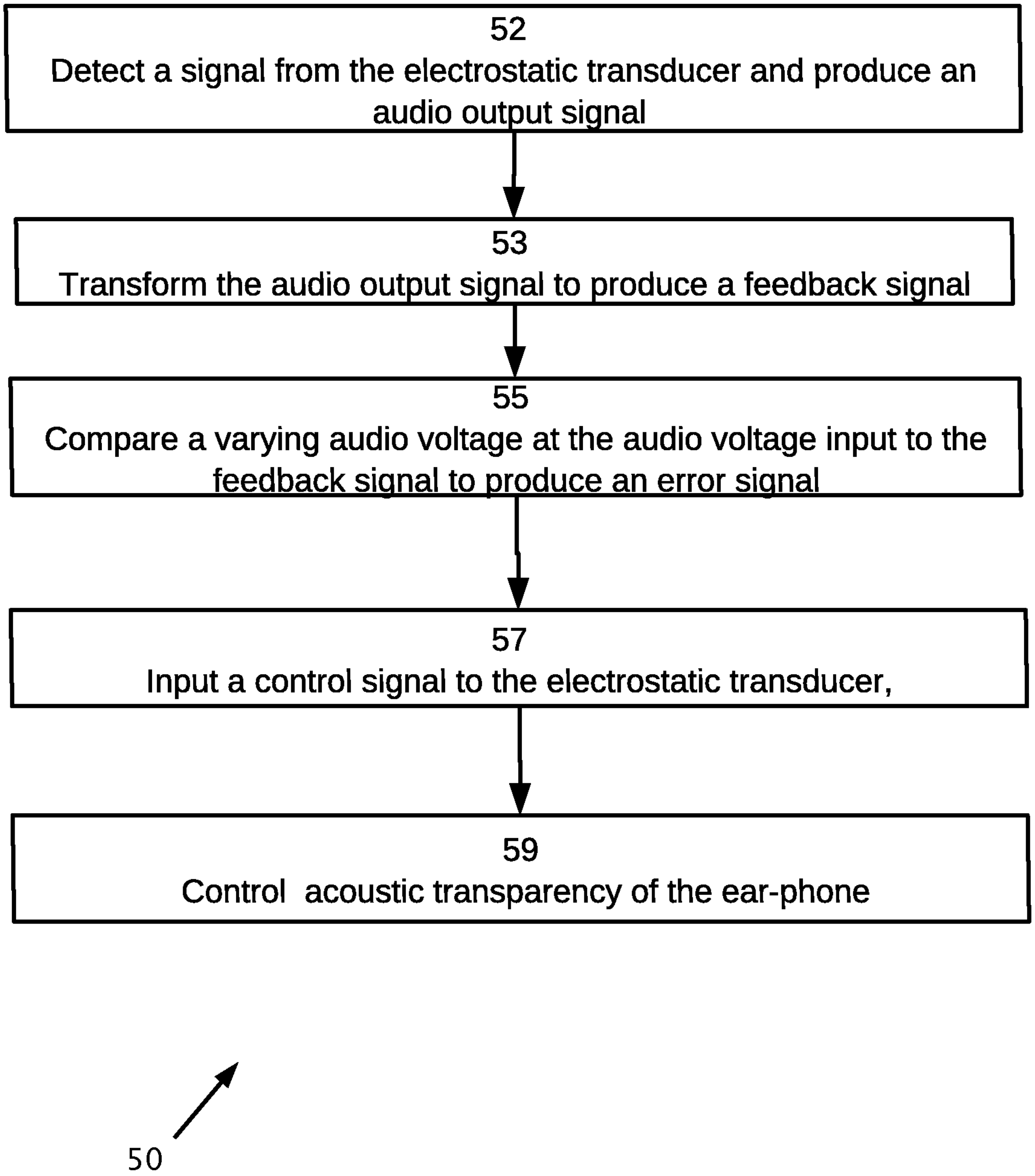
FIG. 5 is a flow diagram of a method, according to features of the present invention.

Reference is now also made to FIG. 5, flow diagram of a method 50, according to features of the present invention. Detector 30 may be configured to produce (step 52) an audio output signal $V_o$, varying at audio frequency. A transform circuit 22 may be configured to transform (step 53) the audio output signal to produce a feedback signal 27. A comparator 23 may be configured to compare (step 55) a varying input audio voltage $V_i$ at the audio voltage input to feedback signal 27 to produce (step 55) an error signal 25. A controller 21 may be configured to input (step 57) a control signal 26 to electrostatic transducer 10. Control signal 26 may be responsive to error signal 25. Control signal 26 may be configured to control acoustic transparency (step 59) of the earphone assembly, from the air external to housing 17 through membrane 15 to nozzle 16. Control signal 16 and a level of the varying input audio voltage $V_i$ may be configured to control acoustic transparency of the earphone assembly 101, from the air external to housing 17,18 through membrane 15 to nozzle 16.

In response to ambient sound, distance d between membrane 15 and electrodes 11 changes resulting in a change in capacitance C of electrostatic acoustic device 10. A changing current i(t) due to ambient noise may be sensed using a transimpedance amplifier 30, approximated by:

$$i(t) = V_{DC}\frac{dC}{dt} \tag{2}$$

Alternatively, a charge amplifier 30 may be considered, instead of a transimpedance amplifier, which integrates current i(t) to sense charge Q(t) which varies with changing capacitance of electrostatic acoustic device 10, and the sensed charge is converted to an output noise voltage signal $V_{oN}$.

Amplifier 30 may be configured to be inverting or non-inverting, and may have a band-pass of 600-900 Hertz, (—3 dB cut-off), centered out-of-band for audio frequencies, between 0.1-10 megahertz, and preferably far from any resonances of membrane 15. Voltage output of amplifier 30, may be added to a signal combiner or multiplier 32.

In the presence of ambient sound or noise, total output voltage $V_O$ is a sum of audio output voltage $V_{oA}$ resulting from input audio signal $V_i$ and the output ambient sound/noise voltage signal $V_{oN}$ which is sensed directly by membrane 15 of acoustic device 10.

$$V_o = V_{oA} + V_{oN} \tag{3}$$

Assuming an equivalent input ambient noise $V_{EIN}$ by referring the output noise back to the input of PID controller 24 with open loop gain G, according to:

$$V_{oN} = G \cdot V_{EIN} \tag{4}$$

then equation (1) explicitly including ambient sound becomes:

$$\frac{V_{oA} + V_{oN}}{v_i + V_{EIN}} = \frac{G(s)}{1 + G(s) \cdot H(s)} \tag{5}$$

Modes of Operation

Figure 4:
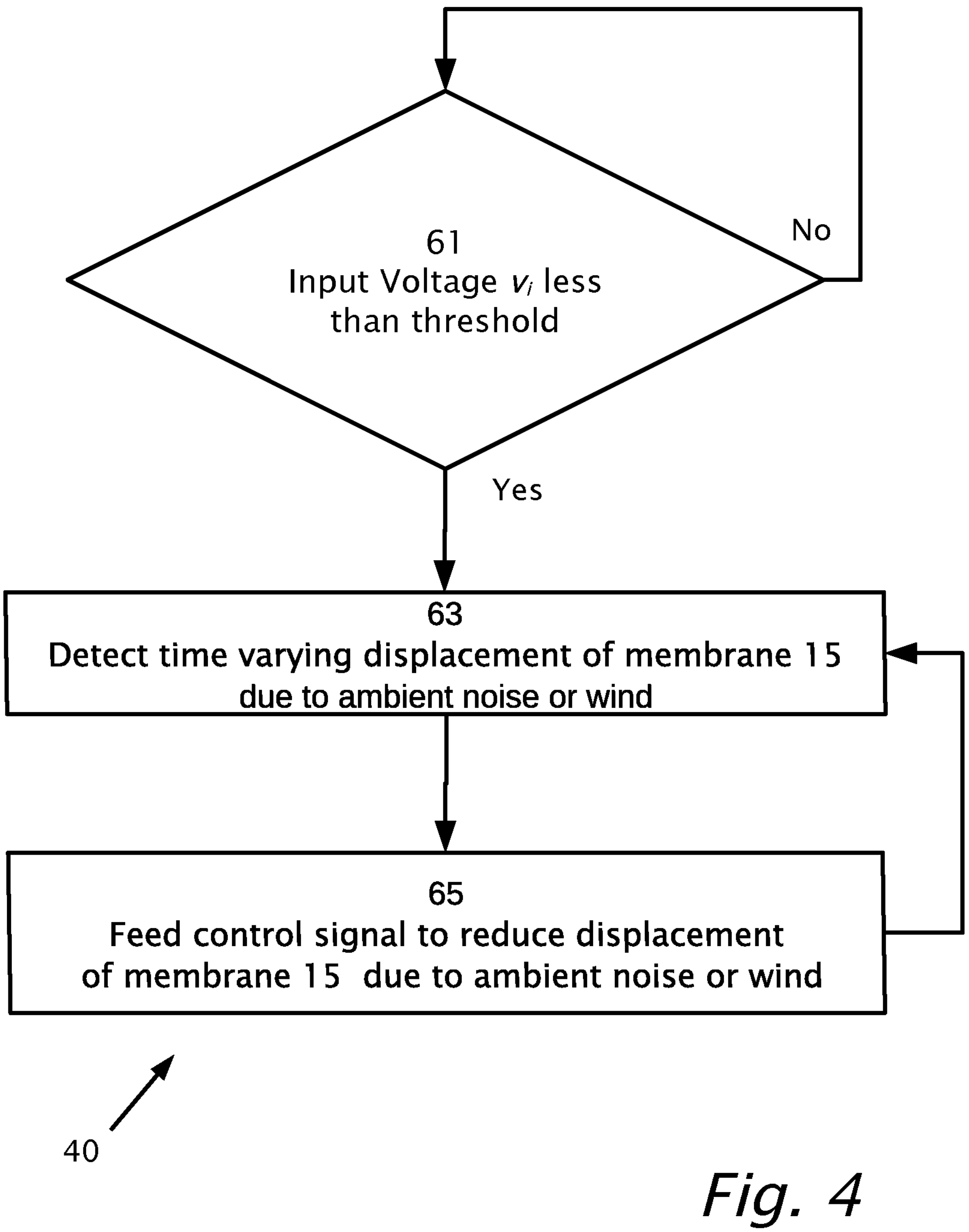
FIG. 4 is a flow diagram of a method, illustrating features of the present invention.

1) Noise Cancellation: $v_i < V_{EIN}$, $V_{oA} < V_{oN}$: User may not be interested in hearing audio and may turn off audio input or otherwise input audio signal is much less than equivalent input noise. Reference is now also made to FIG. 4 which is a flow diagram 40 of a method illustrating noise cancellation. Noise cancellation may be based on detection signal $V_o$ which is responsive to ambient sound transducing motion of membrane 15 and fed back to input of control circuit 20 as feedback signal 27. A second input is the control or set point signal which may be audio input signal $v_i$. Control circuit 20 which, when input audio signals $v_i$ are less than a previously determined or user determined threshold (decision block 61), detects (step 63) the time varying displacement of membrane 15 and feeds (step 65) a control signal 26 to acoustic device 10 to reduce the displacement of membrane 15 due to ambient sound or noise. Thus, when electrostatic acoustic device 10 is used as an earphone and sealed into the ear canal, the mechanical displacement of the ear drum becomes coupled with the mechanical displacement of membrane 15, tending to actively cancel ambient sound, noise and/or noise due to air movement, e.g. wind, otherwise sensed by the user.

2) Full Acoustic Transparency: $V_i > V_{EIN}$, $V_{oA} > V_{oN}$

In order to be aware of acoustic environment while listening to audio, user may turn off noise cancellation by disabling or bypassing PID controller 24 and nulling feedback 22, H(s)=0. Ambient sound enters earphone 101 through apertures 14 and transduces motion in membrane 15 which is sealed within channel 16. Membrane 15 may be acoustically coupled to a user's eardrum which is also sealed within channel 16 allowing the user to sense ambient sound.

3) Adjustable Acoustic Transparency: $V_i$ $V_{EIN}$, $V_{oA} \approx V_{oN}$

Feedback circuit 20 may be used to tune acoustic transparency of acoustic device 10 when used as an in-ear earphone.

Acoustic transparency through earphone 101 may be controlled via electrostatic feedback actuation and position sensing of membrane 15 with a variable gain G(s) as shown in block 21 and/or gain adjustments within PID 24, within the effective frequency bandwidth of the feedback actuation. Input voltage $V_i$ may be controlled so that the output signal $V_o$ approaches a set point. An increase of input voltage $V_i$ correspondingly increases output audio voltage $V_{oA}$ without significantly increasing output noise or ambient sound voltage $V_{oN}$ which depends primarily on $V_{DC}$. Similarly a decrease of input voltage $V_i$ correspondingly decreases output audio voltage $V_{oA}$ without significantly decreasing output noise or ambient sound voltage $V_{oN}$. It may be advantageous in some applications such as in a live in-ear monitor to maintain a constant audio output level while independently adjusting for changes in ambient sound from other performers and the audience, by way of example.

Reference is now made again to FIG. 3, which illustrates a balanced power configuration with amplifiers 36A and 36B respectively outputting audio voltage signals $\pm V_i$ to electrodes 11. As input voltage $V_i$ is increased, gains of amplifiers 36A and 36B may be correspondingly decreased to maintain relatively constant output audio voltage level $V_{oA}$ (and relatively constant feedback signal 27) and less ambient sound may be heard by the user. Similarly, as input voltage $V_i$ is decreased, gains of amplifiers 36A and 36B may be correspondingly increased to maintain relatively constant output audio voltage $V_{oA}$ and more ambient sound may be heard by the user. Alternatively or in addition, PID 24 gain may be used (or another cascaded amplifier feeding device 10) and configured for gain control included in block referenced G(s) in FIG. 2.

4) Adjustable physical aperture 14

Referring again to FIG. 1B, in the presence of high ambient sound or noise, it may be desirable to limit acoustic transmission into earphone 101 by adjusting the size or number apertures 14 and using one of the previously described modes of operation: 1) Noise Cancellation, 2) Full Acoustic Transparency or 3) Adjustable Acoustic Transparency.

For instance, in a live production a vocalist may desire to use an in-ear monitor in the presence of high ambient sound from other performers and the audience. It may be desirable to limit ambient sound with a physical aperture adjustment and provide for acoustic transparency adjustment while maintaining output audio level as described in 3) above.

Alternative Configurations for Control Circuit 21

Figure 3A:
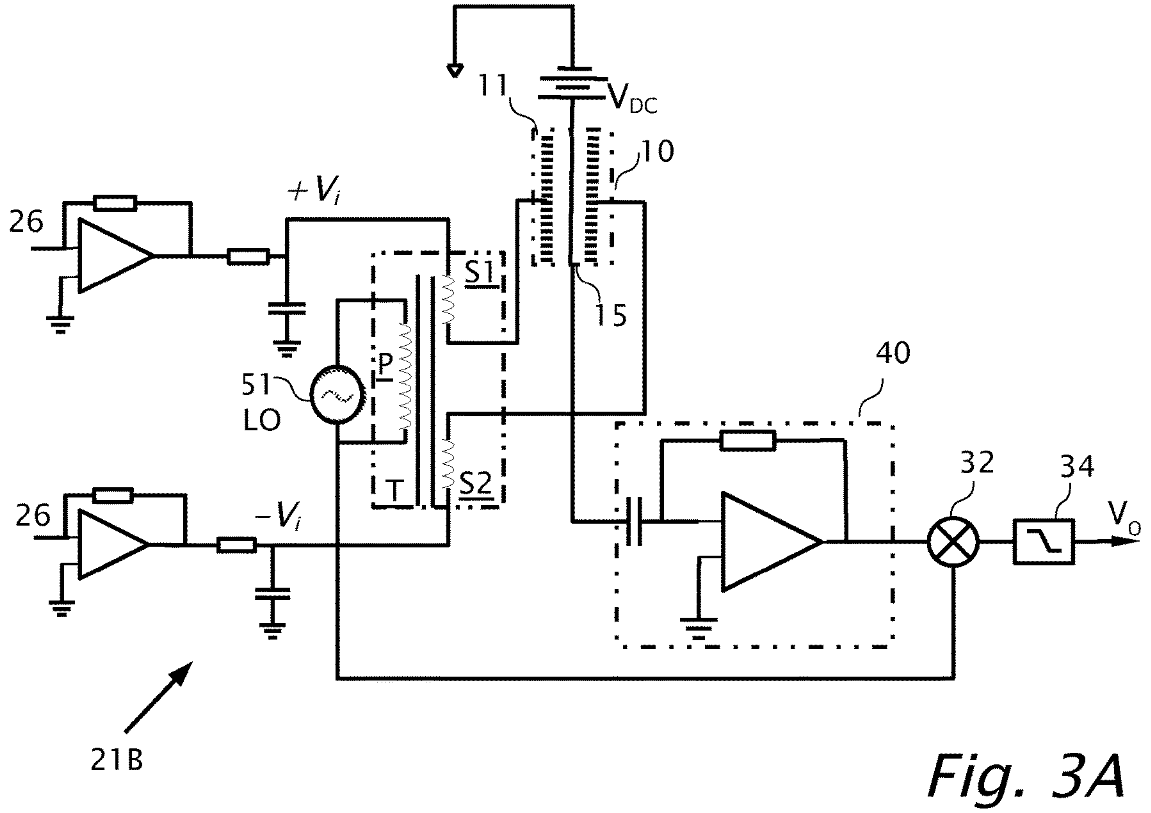
FIG. 3A is an alternative electronic block diagram of a control circuit including an electrostatic acoustic device, in the forward path of the feedback control system of FIG. 2

Reference is now made to FIG. 3A, which illustrates schematically a controller 21B, an alternative for system 21 in FIG. 2, according to features of the present invention. Controller 21B includes electrostatic acoustic device 10 which may be configured to receive in a balanced configuration a high voltage audio input $+V_i$ at first electrode 11 and an inverted high voltage audio input $-V_i$ at second electrode 11 varying at audio frequencies intended for transduction into sound by electrostatic acoustic device 10. In addition, membrane 15 may respond mechanically as device 10 may behave as a capacitive microphone to undesirable ambient sound waves or noise.

A probe signal from a local oscillator (LO) 51 at radio frequency, e.g. 0.1-10 megahertz may be coupled between the primary windings P of a transformer T. Audio signals$\pm V_i$ and inverted audio signal $-V_i$ are fed respectively to electrodes 11 through series connected secondary windings S1 and S2 of transformer T. Audio signals$\pm V_i$ may be high voltage signals. Alternatively, audio signals$\pm V_i$ may be voltage signals up to ~+200V with direct current high voltage applied to membrane 15 as shown in device 10 (FIG. 1A). The probe signal produces a current which has a magnitude determined by the characteristic reactance of the electric circuit formed by the membrane 15 and electrode 11, essentially a variable capacitor. Probe signal from local oscillator (LO) 51 may also be combined with the voltage output of amplifier 30 at signal combiner/multiplier 32. Signal combiner/multiplier 32 outputs to a low pass filter 34 which demodulates and transmits voltage output signal $V_o$, varying at audio frequencies. System 21B is a homodyne detection circuit which uses local oscillator 51 as a reference which is multiplied with the measured signal output of amplifier 30 at the same frequency. The base band or DC component of this multiplication includes the signal which is frequency converted from a narrow band around LO 51 frequency detected with a very high signal to noise ratio.

Figure 3B:
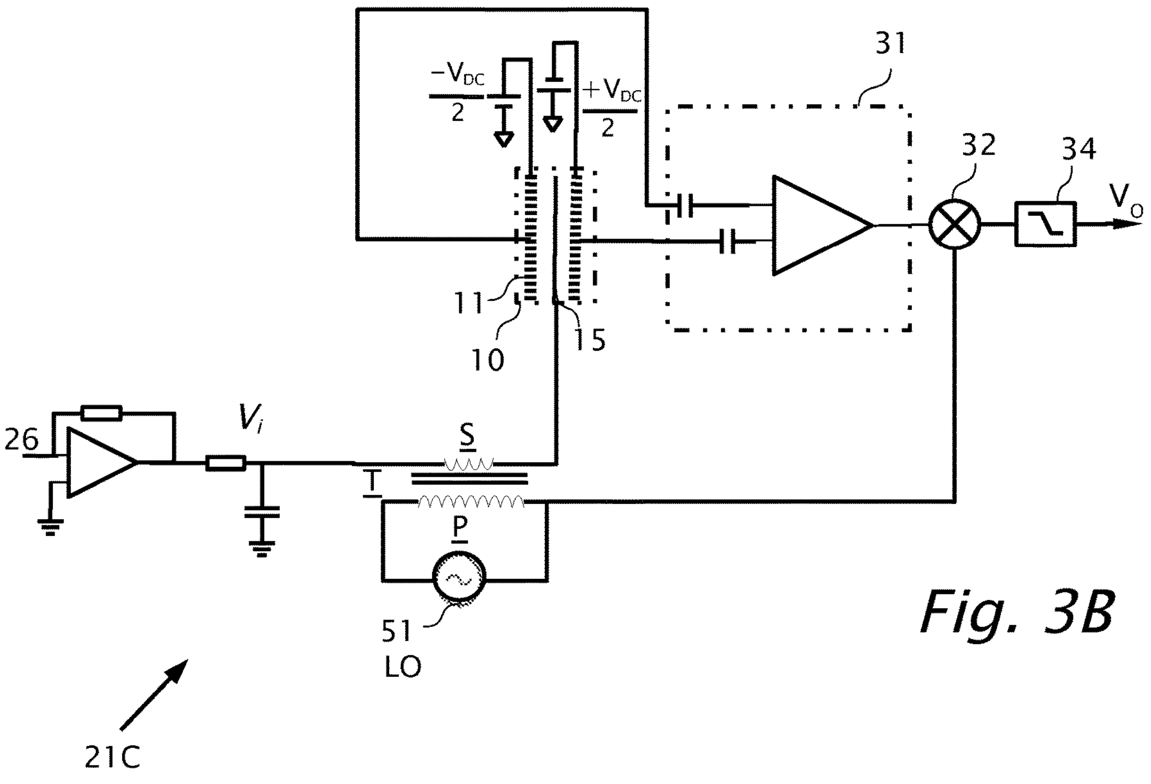
FIG. 3B is another alternative electronic block diagram of a control circuit in the forward path of the feedback control system of FIG. 2.

Reference is now made to FIG. 3B, which illustrates controller 21C, an alternative for system 21 (FIG. 2), according to features of the present invention. In controller 21B, audio voltage $V_i$ in a single ended configuration may be applied to membrane 15. A probe signal from a local oscillator 51 may also be induced onto membrane 15 using a transformer T with primary P connected in parallel with local oscillator 51 and secondary S connected in series between audio voltage $V_i$ and membrane 15. Bias voltage $V_{DC}$ is symmetrically applied on electrodes 11 with $-V_{DC}/2$ on a first electrode 11 and $+V_{DC}/2$ applied on a second electrode 11. A differential amplifier 31 may be used with inputs capacitively coupled respectively to electrodes 11. The voltage output of differential amplifier 31 varies with capacitance of device 10. Probe signal from local oscillator (LO) 51 may also be combined with the voltage output of differential amplifier 31 at signal combiner/multiplier 32. Signal combiner/multiplier 32 outputs to a low pass filter 34 which demodulates and transmits voltage output signal $V_o$, varying at audio frequencies. Differential amplifier 31 may be implemented using Texas Instruments/Burr-Brown™ INA105. According to features of the present invention controller 21C has an advantage over controller 21B because when a high voltage audio signal V; is used, one and not two high voltage input amplifiers are used.

The term "homodyne" as used herein refers to a method of detection/demodulation of a signal which is phase and/or frequency modulated onto an oscillating signal by combining with a reference oscillation.

The term "ambient" as used herein refers to the environment outside the earphone housing.

The term "acoustic transparency" as used herein refers to at least 1% acoustic transmissivity from the ambient to an ear of the user or less than about 20 decibel acoustic isolation. Acoustic transparency of membrane 15 is analogous to membrane 15 apparent stiffness, which controls the sound transmission coefficient from the outside space to the ear canal sealed volume through the boundary defined by membrane 15.

The term "driver" as used herein is an electronic circuit configured to electrically bias, input and/or output signals from an electrostatic acoustic device.

The term "phase sensitive detector circuit" as used herein is an electronic circuit including essentially a multiplier (or mixer) and a loop filter that produces a direct-current output signal that is proportional to the product of the amplitudes of two alternating-current input signals of the same frequency and to the cosine of the phase between them.

The term "transimpedance amplifier" as used herein converts current to voltage. Transimpedance amplifiers may be used to process current output of a sensor to a voltage signal output.

The term "charge amplifier" as used herein converts a time varying charge to a voltage output typically by integrated a time varying current signal.

The term "audio" or "audio frequency" refers to an oscillation rate of an alternating electric current or voltage or of a magnetic, electric or electromagnetic field or mechanical system in the frequency range 0-20,000 Hertz.

The term "comparing" as used herein in the context of producing an error signal, may be performed equivalently by a signal combiner with an inverted signal, by subtracting signals or by a comparator, by way of examples.

The term "audio signal", "audio output", "audio output signal" as used herein refer to an electrical signal varying essentially at audio frequency.

The term "radio frequency" (RF) is the oscillation rate of an alternating electric current or voltage or of a magnetic, electric or electromagnetic field or mechanical system in the frequency range from around twenty thousand times per second (20 kHz) to around three hundred billion times per second (300 GHz).

The transitional term "comprising" as used herein is synonymous with "including", and is inclusive or open-ended and does not exclude additional element or method steps not explicitly recited. The articles "a", "an" is used herein, such as “an aperture” or “an electrode” have the meaning of “one or more” that is “one or more apertures”, “one or more electrodes”.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The claimed invention is:

1. An earphone assembly comprising:
- an electrostatic transducer including a membrane, a first electrode and a second electrode;
- wherein the first electrode is disposed parallel to the membrane, wherein the membrane is configured to respond mechanically to a varying first electric field in accordance with respective electric potentials applied between the first electrode and the membrane;
- wherein the second electrode is disposed parallel to the membrane opposite from the first electrode; wherein the membrane is configured to respond mechanically to a varying second electric field in accordance with respective electric potentials between the second electrode and the membrane; wherein the first and second electrodes have through holes configured for acoustic transmission to and from the membrane; and
- a housing including: (i) a nozzle configured for acoustic transmission from the membrane through the holes of the first electrode to an ear canal and (ii) an aperture configured to provide acoustic transmission through the holes of the second electrode between the membrane and air external to the housing.

2. The earphone assembly of claim 1, further comprising:
- a mechanism attachable to the aperture, the mechanism configured to adjust the acoustic transmission through the aperture by adjusting the aperture.

3. The earphone assembly of claim 1, further comprising:
- first and second membrane supports attached to an edge of the membrane, wherein a central region of the membrane is unsupported by the membrane supports;
- wherein the first membrane support and the first electrode are manufactured as a single element, wherein the second membrane support and the second electrode are manufactured as a single element.

4. The earphone assembly of claim 1, wherein the first electrode includes a first conductive layer deposited on an electrically insulated substrate, the first conductive layer assembled proximate to the membrane; wherein the second electrode includes a second conductive layer deposited on an electrically insulated substrate, the second conductive layer assembled proximate to the membrane.

5. The earphone assembly of claim 1, further comprising a control circuit including:
- an audio voltage input;
- a detector configured to detect a current or charge signal from the electrostatic transducer, the current or charge signal including an audio signal varying at audio frequencies, wherein the detector is configured to produce an audio output signal varying at audio frequency;
- a transform circuit configured to transform the audio output signal to produce a feedback signal;
- a comparator configured to compare a varying input audio voltage at the audio voltage input to the feedback signal to produce an error signal; and
- a controller configured to input a control signal to the electrostatic transducer, the control signal responsive to the error signal,
- wherein the control signal is configured to control acoustic transparency of the earphone assembly, from the air external to the housing through the membrane to the nozzle.

6. The earphone assembly of claim 5, wherein a probe signal varying at radio frequency is injected into the electrostatic transducer, wherein the current or charge signal is detected by converting the current or charge signal to a modulated voltage signal, wherein the current or charge signal includes the audio signal modulating the radio frequency of the probe signal.

7. The earphone assembly of claim 5, wherein the control signal and a level of the varying input audio voltage are configured to control acoustic transparency of the earphone assembly, from the air external to the housing through the membrane to the nozzle.

8. The earphone assembly of claim 5, wherein the control signal and a level of the varying input audio voltage are configured to maintain a level of the audio output signal varying at audio frequency by controlling a level of the control signal in accordance with a level of a varying audio voltage at the varying audio voltage input.

9. The earphone assembly of claim 5, wherein the control signal and a level of the varying audio voltage are configured to maintain a level of the audio output signal varying at audio frequency by controlling a level of the control signal inversely with a level of a varying audio voltage at the varying audio voltage input.

10. The earphone assembly of claim 5, wherein the control signal is configured to cancel at least in part a mechanical response of the membrane due to ambient sound.

11. The earphone assembly of claim 5, wherein the control signal is configured to cancel at least in part a mechanical response of the membrane due to air motion through or around the aperture.

12. The earphone assembly of claim 5, wherein the control signal is configured to limit mechanical displacement of the membrane.

13. The earphone assembly of claim 5, further comprising:
- a battery;
- a power circuit, connectable to the battery, the power circuit configured as:
- (i) a single ended power circuit wherein DC bias voltages are applied on the electrodes and an audio signal is applied to the membrane, and the detector is configured to detect the current or charge signal on the electrodes; or
- (ii) a balanced power circuit, wherein a non-inverted audio signal may be applied to one of the electrodes and an identical but inverted audio signal may be applied to the other electrode and the membrane is biased with a DC bias voltage, and the detector is configured to detect the current or charge signal on the membrane.

14. The earphone assembly of claim 1, further comprising:
- a seal configured to removably attach to the nozzle and configured to seal acoustically an interior of the nozzle to the inside of an ear canal.

15. A method performable in an earphone assembly including an electrostatic transducer including: an audio voltage input, a membrane, a first electrode and a second electrode;

wherein the first electrode is disposed parallel to the membrane, wherein the membrane is configured to respond mechanically to a varying first electric field in accordance with respective electric potentials applied between the first electrode and the membrane, wherein the second electrode is disposed parallel to the membrane opposite from the first electrode; wherein the membrane is configured to respond mechanically to a varying second electric field in accordance with respective electric potentials between the second electrode and the membrane; wherein the first and second electrodes have through holes configured for acoustic transmission to and from the membrane, a housing including: (i) a nozzle configured for acoustic transmission from the membrane through the holes of the first electrode to an ear canal and (ii) an aperture configured to provide acoustic transmission through the holes of the second electrode between the membrane and air external to the housing, the method comprising:

detecting a current or charge signal from the electrostatic transducer, the current or charge signal including an audio signal varying at audio frequencies, thereby producing an audio output signal varying at audio frequency;

transforming the audio output signal to produce a feedback signal;

comparing a varying audio voltage at the audio voltage input to the feedback signal to produce an error signal;

responsive to the error signal, inputting a control signal to the electrostatic transducer; and controlling thereby acoustic transparency of the earphone assembly, from air external to the housing through the membrane to the nozzle.

16. The method of claim 15, further comprising:

maintaining a level of the audio output signal varying at audio frequency by controlling a level of the control signal in accordance with a level of a varying audio voltage at the audio voltage input.

17. The method of claim 15, further comprising:

maintaining a level of the audio output signal varying at audio frequency by controlling a level of the control signal inversely with a level of a varying audio voltage at the audio voltage input.

* * * * *